F. M. COLSON.
FALSE BOTTOM FOR COOKING UTENSILS.
APPLICATION FILED APR. 20, 1918.
1,343,114.
Patented June 8, 1920.
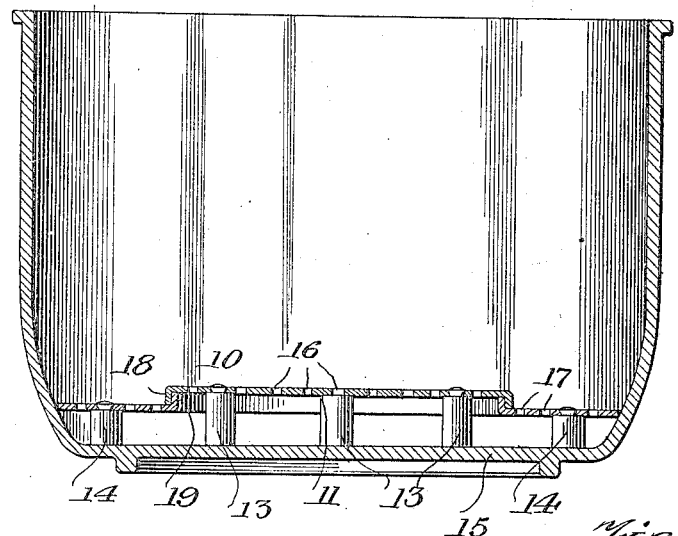
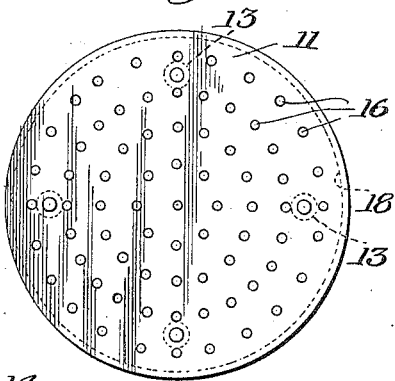
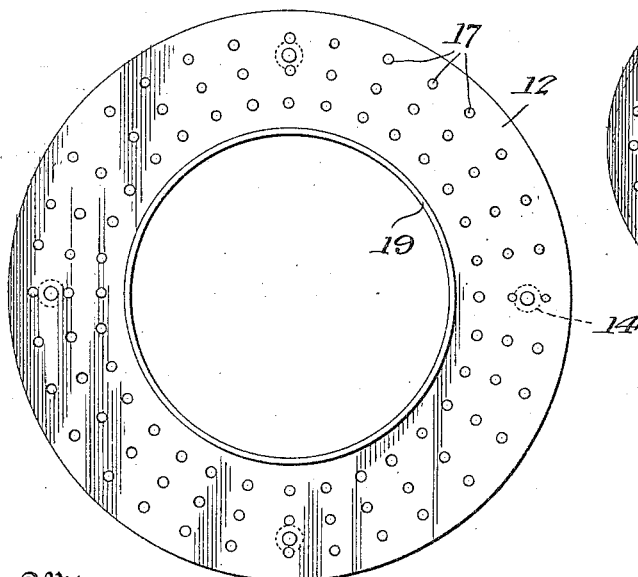
Witnesses
Le Roy Kauffman.
Inventor
Frankie M. Colson
By Victor J. Evans
Attorney

UNITED STATES PATENT OFFICE.

FRANKIE M. COLSON, OF SALT LAKE CITY, UTAH.

FALSE BOTTOM FOR COOKING UTENSILS.

1,343,114.      Specification of Letters Patent.      Patented June 8, 1920.

Application filed April 20, 1918. Serial No. 229,801.

*To all whom it may concern:*

Be it known that I, FRANKIE M. COLSON, a citizen of the United States, residing at Salt Lake City, in the county of Salt Lake and State of Utah, have invented new and useful Improvements in False Bottoms for Cooking Utensils, of which the following is a specification.

This invention relates to cooking utensils and has especial relation to false perforated bottoms for the same by means of which food within the utensil will be spaced from the bottom to prevent burning or sticking. It also acts to evenly distribute heat through the food, resulting in a more even cooking of the contents of the receptacle and in the conservation of heat.

Specifically stated the invention comprehends the provision of a perforated disk supported upon legs so as to be spaced from the bottom of the receptacle and having around the inner periphery of a perforated ring also supported upon legs, the ring providing for the use of the device within receptacles of different sizes. Any number of these rings may be used in connection with a single disk, all of the rings to be of the same internal diameter, but being of different external diameters.

In the drawings:—

Figure 1 is a sectional view through a cooking utensil or similar receptacle with the invention in position therein;

Fig. 2 is a plan view of the disk which forms a part of the invention; and

Fig. 3 is a similar view of the ring which surrounds and detachably engages the disk.

Referring to the drawings in detail wherein like characters of reference denote corresponding parts, the invention comprises a false perforated bottom 10, which is formed of an inner section or disk 11 and an outer section or ring 12, the inner and outer sections having legs 13 and 14 respectively by means of which they are spaced from the bottom of the receptacle 15.

The inner section or disk 11 is perforated throughout its entire area as shown at 16, while similar perforations 17 are provided in the ring 12. Surrounding the disk 11 is a downwardly extending flange 18, which is adapted to engage over an upwardly extending flange 19 located around the inner periphery of the ring 12, providing a detachably interlocking engagement between the inner and outer sections of the bottom. It is the purpose of the invention to provide a number of rings having the same internal diameter, but of a different external diameter, so that the bottom may be used in connection with receptacles of various sizes. It is of course apparent that the inner section or disk 11 may be used independently of the ring 12, the latter being for the purpose of enlarging the diameter of the bottom when necessary. It is also apparent that the inner and outer sections of the bottom 10 may be made in various shapes and designs and it is not the purpose of the invention to limit the same to a circular shape.

The invention is susceptible of various changes in its form, proportions and minor details of construction and the right is herein reserved to make any changes that properly fall within the scope of the appended claim.

Having described the invention, what is claimed is:—

The combination with a receptacle, of a false bottom formed of separate independent sections and comprising a perforated disk, legs carried by and supporting the disk, a perforated ring surrounding the disk, legs also carried by and supporting said ring, a downwardly extending vertical flange surrounding the disk and an upwardly extending vertical flange surrounding the inner periphery of the ring for engagement within the disk flange for locking the disk and ring together.

In testimony whereof I affix my signature.

FRANKIE M. COLSON.